United States Patent
Huang

(10) Patent No.: US 9,376,956 B2
(45) Date of Patent: Jun. 28, 2016

(54) TURBOCHARGING APPARATUSES AND VEHICLES USING THE SAME

(75) Inventor: Jinlin Huang, Guangxi (CN)

(73) Assignee: NANNING JINLIN ENVIRONMENTAL PROTECTION TECHNOLOGY COMPANY, Nanning, Guangxi (CN)

( * ) Notice: Subject to any disclaimer, the term of this patent is extended or adjusted under 35 U.S.C. 154(b) by 227 days.

(21) Appl. No.: 14/124,373

(22) PCT Filed: Jun. 4, 2012

(86) PCT No.: PCT/CN2012/000769
§ 371 (c)(1),
(2), (4) Date: Dec. 24, 2013

(87) PCT Pub. No.: WO2012/167608
PCT Pub. Date: Dec. 13, 2012

(65) Prior Publication Data
US 2014/0102425 A1    Apr. 17, 2014

(30) Foreign Application Priority Data
Jun. 8, 2011 (CN) .......................... 2011 1 0151460

(51) Int. Cl.
*F02B 33/44*    (2006.01)
*F02B 33/40*    (2006.01)
(Continued)

(52) U.S. Cl.
CPC ................. *F02B 33/40* (2013.01); *F02B 39/08* (2013.01); *F02C 6/12* (2013.01);
(Continued)

(58) Field of Classification Search
CPC ........... F01P 2060/02; F01P 5/12; F01P 7/16; F01P 7/14; F02B 29/04; F02B 33/34; F02B 29/0431; F03D 11/04; Y02E 10/728; Y02E 10/722; B62D 35/007
USPC ............. 123/559.1; 415/220; 60/605.1, 605.3
See application file for complete search history.

(56) References Cited

U.S. PATENT DOCUMENTS 4,962,642 A * 10/1990 Kim ................................ 60/272
6,338,391 B1   1/2002 Severinsky et al.
(Continued)

FOREIGN PATENT DOCUMENTS

CN    1129281    8/1996
CN    2519022    10/2002
(Continued)

OTHER PUBLICATIONS

Extended European Search Report for EP Application No. 12796659.6 mailed Nov. 17, 2014.
(Continued)

*Primary Examiner* — Thai Ba Trieu
*Assistant Examiner* — Shafiq Mian
(74) *Attorney, Agent, or Firm* — Kilpatrick Townsend & Stockton LLP

(57) ABSTRACT

There is provided a turbocharging apparatus and vehicles using the same. The turbocharging apparatus comprises a wind collecting device, a first turbine and a second turbine. The wind collecting device comprises a first opening and a second opening and an air flow channel for connecting the two openings. A cross-sectional area of the air flow channel decreases as the air flow channel extends from the first opening towards the second opening. The first turbine comprises a first turbine housing, a first impeller rotatably located in the first turbine housing, a wind inlet communicated with the second opening, and a wind outlet. The second turbine comprises a second turbine housing, a second impeller rotatably located in the second turbine housing, an air suction inlet and an air outlet communicated with a throttle valve of the internal combustion engine. The second impeller can, driven by the first impeller, rotate along with the first impeller. The turbocharging apparatus according to the present invention relies on normal-temperature gas flow as a motive power source, substantially reduces production costs and maintenance costs, and meanwhile better ensures stability, high efficiency and durability of the turbocharger.

13 Claims, 17 Drawing Sheets

(51) Int. Cl.
*F02M 35/16* (2006.01)
*F02M 35/10* (2006.01)
*F02B 39/08* (2006.01)
*F02C 6/12* (2006.01)

(52) U.S. Cl.
CPC .. *F02M 35/10013* (2013.01); *F02M 35/10118* (2013.01); *F02M 35/161* (2013.01); *F05B 2240/941* (2013.01); *F05D 2220/40* (2013.01); *F05D 2220/62* (2013.01); *F05D 2250/511* (2013.01); *Y02T 10/14* (2013.01)

(56) References Cited

U.S. PATENT DOCUMENTS

| | | | | |
|---|---|---|---|---|
| 6,928,979 | B2 * | 8/2005 | Chen | 123/306 |
| 2009/0158733 | A1 | 6/2009 | Swenson et al. | |
| 2010/0146968 | A1 * | 6/2010 | Simpson et al. | 60/605.2 |
| 2010/0154756 | A1 * | 6/2010 | Chien | 123/559.1 |
| 2015/0135705 | A1 * | 5/2015 | Pursifull | 60/599 |

FOREIGN PATENT DOCUMENTS

| | | |
|---|---|---|
| CN | 2603223 | 2/2004 |
| CN | 2608717 Y | 3/2004 |
| CN | 101201011 | 6/2008 |
| CN | 102352788 | 2/2012 |
| EP | 1522450 A2 | 4/2005 |
| GB | 2147356 | 5/1985 |
| GB | 2241443 | 9/1991 |
| JP | 2008-208787 | 9/2008 |

OTHER PUBLICATIONS

International Search Report and Written Opinion for International Application No. PCT/CN2012/000769 mailed Oct. 18, 2012 along with an English translation of International Search Report (14 pages). Search Report corresponding to Chinese Application No. 201210193224X.

* cited by examiner

TURBOCHARGING APPARATUSES AND VEHICLES USING THE SAME

CROSS-REFERENCE TO RELATED APPLICATIONS

This application is a national stage application of PCT Application No. PCT/CN2012/000769, entitled, "TURBOCHARGING APPARATUSES AND VEHICLES USING THE SAME," filed on Jun. 4, 2012, which claims priority from Chinese Patent Application No. 201110151460.0, filed on Jun. 8, 2011. The contents of the application are being incorporated by reference herein in their entirety.

FIELD OF THE INVENTION

The present invention relates to a turbocharging apparatus, particularly to a turbocharging apparatus for use in vehicles such as automobiles using an internal combustion engine. The present invention further relates to vehicles using such a turbocharging apparatus.

BACKGROUND OF THE INVENTION

Automobile turbocharging systems used in the global vehicle industry are chiefly classified into four major classes: mechanical turbocharging, exhaust gas turbocharging, pressure wave supercharging and electronic turbocharging, wherein the pressure wave supercharging is not adapted to be mounted on a car due to great heaviness and large noise, and the electronic turbo charging is not well accepted by this industry due to consumption of electrical energy of a generator, generation of too small wind pressure and failure to improve engine performance. The currently popular automobile turbochargers mainly refer to the mechanical turbocharger and exhaust gas turbocharger. The mechanical turbocharger mainly depends on an engine output shaft to obtain a drive force to drive a rotor to force air into an air intake pipe to achieve supercharging. It also consumes engine power and the supercharging efficiency is not high. The exhaust gas turbocharger, as the commonest and most popular turbocharger, does not consume any electrical energy, but propels an impeller by exhaust gas discharged from the engine, and meanwhile drives a coaxial impeller to take in a lot of air to achieve the supercharging purpose. The exhaust gas turbocharger is currently the most efficient supercharging apparatus. However, this technology also has apparent drawbacks: one drawback is high production cost and maintenance cost so that ordinary consumers cannot afford; and a second drawback is low-speed weak. To address the low-speed weakness problem, a composite supercharging system (namely, combined use of the mechanical turbocharger and the exhaust gas turbocharger) must be adopted, which raises the production cost and maintenance cost. This is also the essential reason why the exhaust gas turbocharging and mechanical turbocharging technology still cannot be used universally after use thereof in the past half a century.

A fundamental principle of automobile turbocharging technologies in China, such as "Wind Power Turbocharging Apparatus with Four Air Suction Ports" (announcement number CN2519022), and "Aerodynamic Turbo charging apparatus" (announcement number CN1129281A), still remains in a "natural air suction" phase, i.e., a turbo fan is propelled by a traction force generated by the engine sucking air naturally. However, the amount of air sucked in each suction stroke of the engine is constant (the amount of the sucked air depends on a capacity of a cylinder). Such "turbocharger" converting "suction force" of the engine to fan power, to the most, only changes air flow movement trajectory, and by no means improves air intake pressure. Additionally, when the engine operates at a high speed, the turbine itself becomes an obstacle to air flow. Therefore, these technologies have not yet been recognized in the mainstream automobile industry.

SUMMARY OF THE INVENTION

The inventor of the present invention believes that driving the turbine fan by using air suction function of the engine, using the engine torsion or even directly in an electrically-driven manner will undoubtedly cause consumption of the engine power, is not conducive to improvement of the engine performance and has the above drawbacks in the prior art. Therefore, a novel turbocharging apparatus needs to be proposed to solve at least one of the above problems.

Accordingly, the present invention provides a turbocharging apparatus, comprising a wind collecting device, a first turbine and a second turbine. The wind collecting device is barrel-shaped and comprises a first opening and a second opening located at opposite ends of the wind collecting device respectively, and an air flow channel for connecting the first opening and the second opening and guiding the air flow to flow therethrough. The air flow channel has a cross-sectional area decreasing as the air flow channel extends from the first opening towards the second opening. The first turbine comprises a first turbine housing, a first impeller rotatably located in the first turbine housing, a wind inlet and a wind outlet. The wind inlet is formed on the first turbine housing and connected to the second opening of the wind collecting device to guide air flow from the wind collecting device to enter the first turbine housing and drive the first impeller to rotate. The wind outlet is formed on the first turbine housing to guide the air flow having entered the first turbine housing through the wind inlet and driven the first impeller to rotate to flow out of the first turbine housing. The second turbine comprises a second turbine housing, a second impeller rotatably located in the second turbine housing, an air suction inlet and an air outlet. The second impeller can, driven by the first impeller, rotate along with the first impeller. The air suction inlet is formed on the second turbine housing so that the external air is sucked through the air suction inlet into the second turbine housing due to rotation of the second impeller and supercharged under action of the second impeller. The air outlet is used to guide air supercharged by the second impeller to flow out of the second turbine housing.

The present invention further provides a vehicle having an internal combustion engine and comprising the above-mentioned turbocharging apparatus, wherein the first opening of the wind collecting device is disposed on a windward surface of the vehicle, the air outlet of the second turbine is connected to a throttle valve (namely, an engine air inlet) of the internal combustion engine to deliver the air supercharged by the second impeller to the internal combustion engine.

In the turbocharging apparatus according to the present invention and vehicles using such turbocharging apparatus, the impeller is propelled by the flow of air (wind power) generated when the vehicle travels. Since the turbocharging apparatus according to the present invention uses normal-temperature fresh air flow for propulsion, the turbocharger remains in a normal-temperature operation state all the time. Hence, the turbocharging apparatus according to the present invention may be made of an ordinary metallic material and/or industrial plastic material by a simpler process and by no means needs a facility (such as an intercooler) for cooling high-temperature gas so that the turbocharging apparatus according to the present invention has an overwhelming advantage in respect of production costs and maintenance costs as compared with the exhaust gas turbocharger in the prior art, and meanwhile better ensures stability, high efficiency and durability of the turbocharger.

BRIEF DESCRIPTION OF DRAWINGS

FIGS. 11-13 are schematic views illustrating a water discharge port of the power turbine, wherein FIG. 11 is a schematic view illustrating a piston as a water discharge valve during sliding, FIG. 12 is a schematic view showing the piston at a first position, and FIG. 13 is a schematic view showing the piston at a second position.

DETAILED DESCRIPTION OF PREFERRED EMBODIMENTS

Hereunder, the turbocharging apparatus and the vehicle using the turbocharging apparatus according to the present invention will be described in detail with reference to the figures. In the present invention, the vehicle is a vehicle using an internal combustion engine as a motive power, including but not limited to the automobiles described below as examples only.

Figure 1:
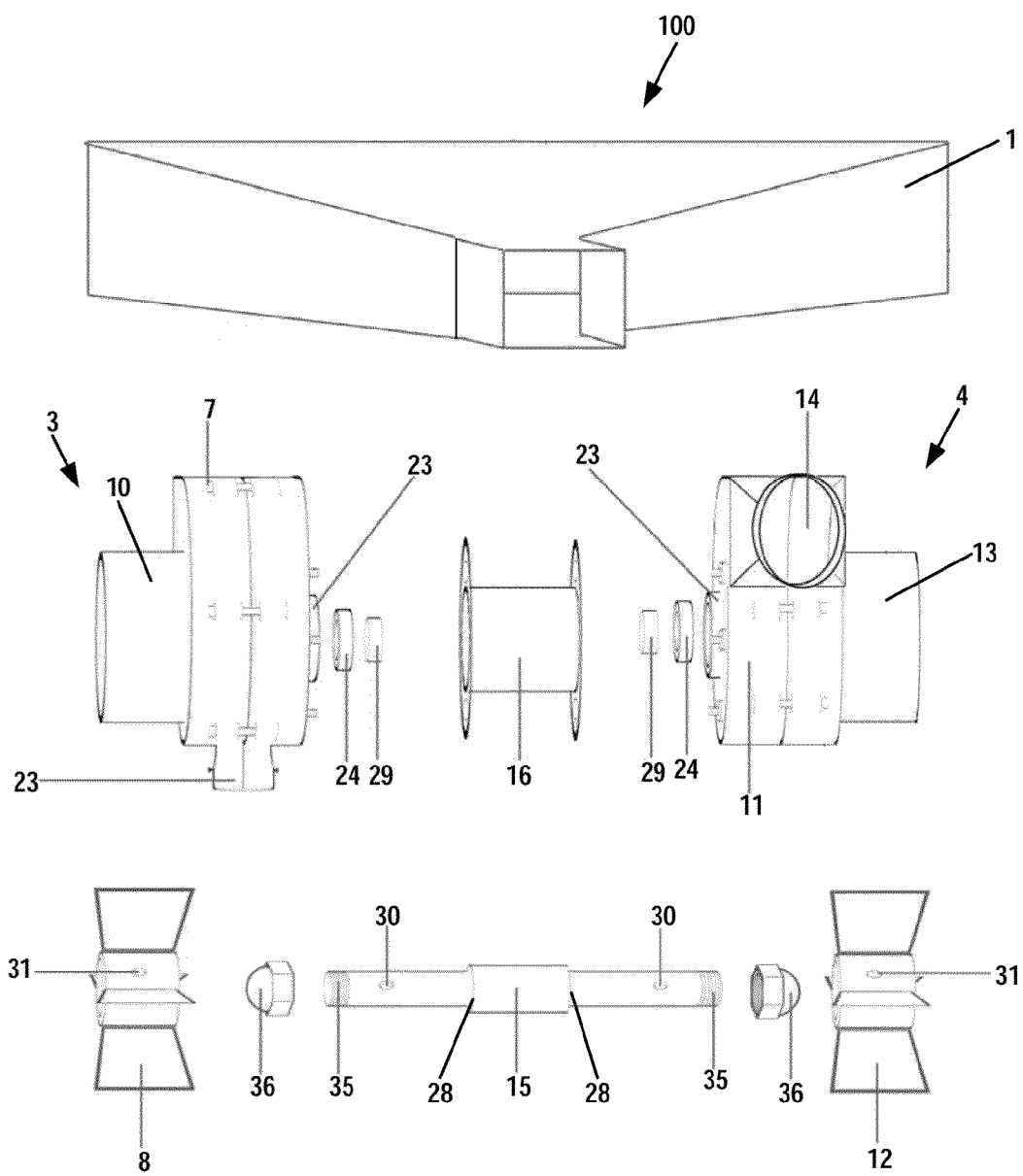
FIG. 1 is an exploded view of general construction of a turbocharging apparatus according to an embodiment of the present invention.
Figure 2:
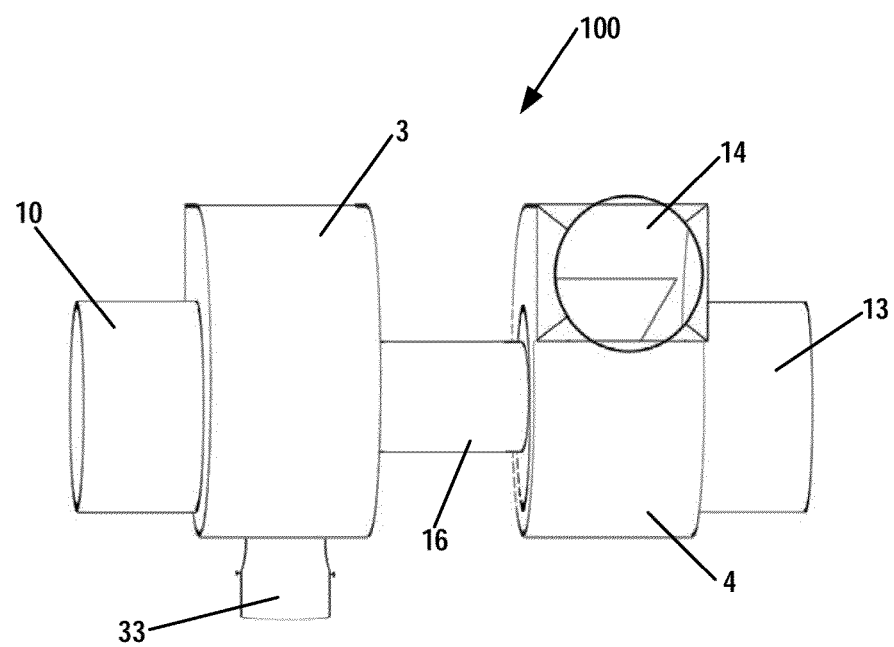
FIG. 2 is a schematic view illustrating an assembled turbocharging apparatus according to an embodiment of the present invention, in which a wind collecting device is omitted.

Reference is made to FIG. 1 and FIG. 2. FIG. 1 is an exploded view of general construction of a turbocharging apparatus according to an embodiment of the present invention. FIG. 2 is a schematic view illustrating an assembled turbocharging apparatus. As shown, the turbocharging apparatus is generally designated by the reference number "100". The turbocharging apparatus 100 according to the present invention comprises a wind collecting device (not shown in FIG. 2), a first turbine 3 and a second turbine 4.

Referring to FIGS. 1, and 14-18, the wind collecting device 1 is generally barrel-shaped and may be integrally formed by for example a molding process. The wind collecting device 1 comprises a first opening 2 and a second opening 5 located at a front end and a rear end (as viewed in an up-down direction of the paper of FIGS. 14 and 15) respectively. The wind collecting device 1 further comprises an air flow channel 6 for connecting the first opening 2 and the second opening 5 and guiding air flow to flow therethrough. A cross-sectional area of the air flow channel 6 decreases as the air flow channel extends from the first opening 2 towards the second opening 5. In the specific embodiment shown in FIGS. 16-20, the first opening 2 of the wind collecting device 1 is disposed on a windward surface (called "windward port" in the following text) of a vehicle such as automobile. As such, when the vehicle moves, external air will form, relative to the wind collecting device 1, an air flow 45 (or called "wind power") opposite to a movement direction of the vehicle (see FIGS. 16 and 17), and enters the air flow channel 6 through the windward port 2. Since the cross-sectional area of the air flow channel 6 is decreased at the second opening 5, so the air flow after having flowed through the air flow channel 6 is "extruded" at the second opening 5 (hence, the second opening is called hereunder as "wind extruding port") and the flow speed thereof increases.

According to the present invention, the cross-sectional area of the air flow channel 6 may be converged from the windward port 2 towards the wind extruding port 5 in any manner. The cross-sectional areas or a ratio of the cross-sectional areas of the windward port 2 and wind extruding port 5 mainly depends on parameters such as displacement of the vehicle such as an automobile using the turbocharging apparatus 100. The relationship between the two may be easily obtained by routine tests.

Those skilled in the art should appreciate that although the cross section of the air flow channel 6 of the wind collecting device 1 as shown in the figures is generally rectangular, the present invention is not limited to this, and any suitable sectional shape may be selected based on specific situations such as appearance, a space of the automobile engine compartment and a mounting space of the engine hood.

In the present invention (described in detail hereunder), the first turbine 3 is used to obtain power from the air flow generated by the movement of the automobile, so as to drive the second turbine 4; the second turbine 4 in turn uses the power from the first turbine 3 to supercharge the sucked air. Therefore, in the following text, the first turbine 3 is called "a power turbine" and the second turbine 4 is called "a surcharging turbine".

Figure 3:
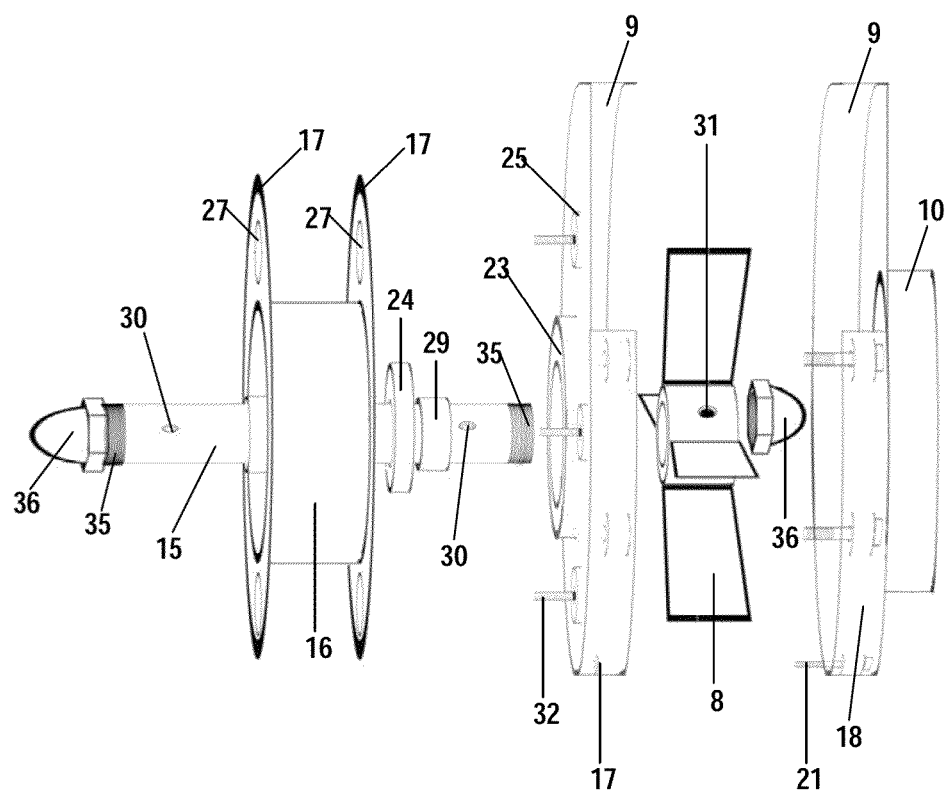
FIG. 3 is an exploded view of a power turbine.
Figure 4:
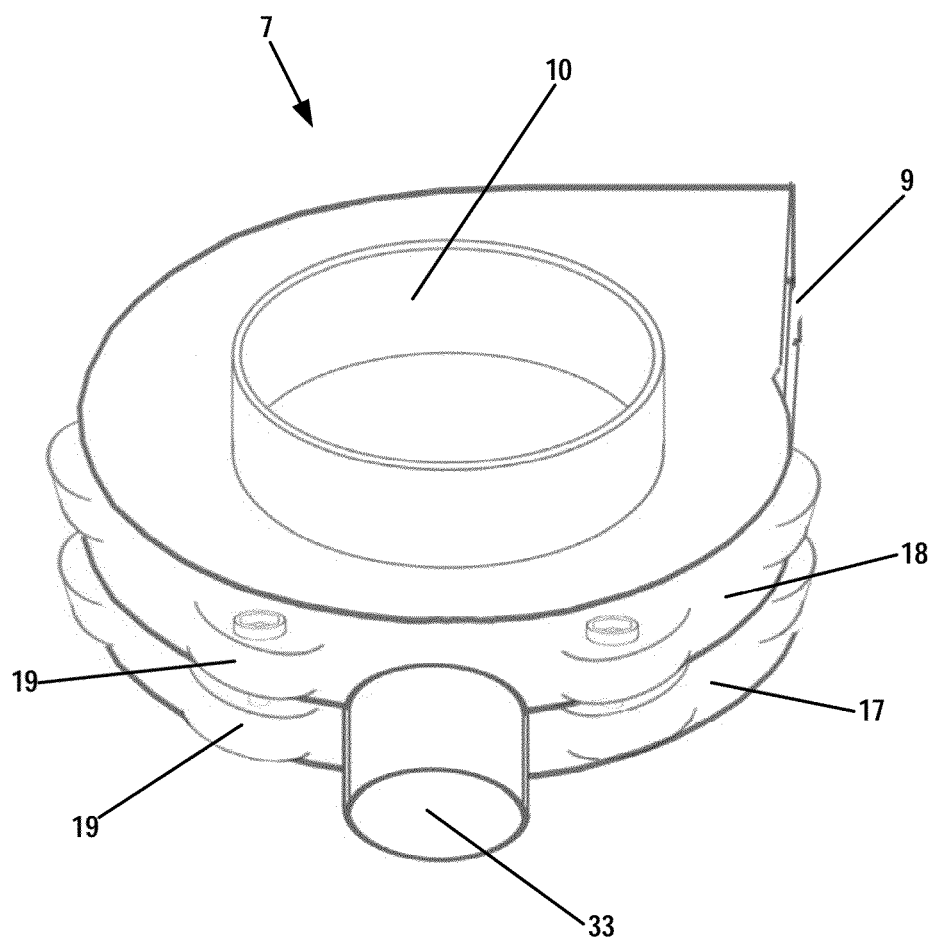
FIG. 4 is a perspective view of an exterior of a power turbine housing.

The power turbine 3 will be described in detail with reference to FIGS. 1-9. As shown in FIGS. 1 and 3, the power turbine 3 comprises a power turbine housing (or a first turbine housing) 7, a power impeller (or a first impeller) 8, a wind inlet 9 and a wind outlet 10 (also referring to FIG. 4). The power impeller 8 is located within the power turbine housing 7 and rotatable in the power turbine housing 7. A size and shape of the power impeller 8 may be determined according to a predetermined power or torque and strength of materials. The wind inlet 9 is formed on the power turbine housing 7 and connected to the wind extruding port 5 of the wind collecting device 1 (see FIGS. 16 and 17) to guide the air flow from the wind collecting device 1 to enter the power turbine housing 7 to drive the power impeller 8 to rotate. The wind outlet 10 is also formed on the power turbine housing 7 to guide the air flow, having entered the power turbine housing 7 through the wind inlet 9 and driven the power impeller 8 to rotate, to flow out of the power turbine housing 7. The positions of wind inlet 9 and wind outlet 10 on the power turbine housing 7 may be determined according to routine designs based on a specific operation form and specific mounting space and mounting position of the power impeller 8. The present invention does not limit this so long as the external air can drive the power impeller 8 to rotate in the course of entering through the wind inlet 9 and flowing out through the wind outlet 10.

Referring to FIG. 1, the supercharging turbine 4 is similar to the power turbine 3 and comprises a supercharging turbine housing (or a second turbine housing 11), a supercharging impeller (or a second impeller) 12, an air suction inlet 13 and an air outlet 14. The supercharging impeller 12 is located within the supercharging turbine housing 11 and can, driven by the power impeller 8, rotate along with the power impeller 8. A size and shape of the supercharging impeller 12 may be determined according to a predetermined power or torque and manufacturing materials. The air suction inlet 13 is formed on the supercharging turbine housing 11. When the supercharging impeller 12 is driven to rotate by the power impeller 8, the external air is sucked through the air suction inlet 13 into the supercharging turbine housing 11 and supercharged under action of the supercharging impeller 12. The air outlet 14 is also formed on the supercharging turbine housing 11 to guide air supercharged by the supercharging impeller 12 to flow out of the supercharging turbine housing 11. As illustrated in more detail hereunder, the supercharged air flowing out of the supercharging turbine 4 enters the internal combustion engine. The positions of air suction inlet 13 and air outlet 14 on the supercharging turbine housing 11 may be determined according to routine designs based on a specific operation form and specific mounting space of the supercharging impeller 12. The present invention does not limit this so long as when the supercharging impeller 12 rotates, external air can be sucked through the air suction inlet 13 into the supercharging turbine housing 11 and the air supercharged by the supercharging impeller 12 is discharged through the air outlet 14.

In the specific embodiment shown in FIGS. 1, 2, 16 and 17, the power turbine housing 7 and supercharging turbine housing 11 are located on opposite sides of a straight-through flange 16 and fixed together with the straight-through flange 16. The straight flange 16 is a sleeve member, through which a rotation shaft 15 runs. The rotation shaft 15 has opposite ends thereof respectively extended into the power turbine housing 7 and the supercharging turbine housing 11 and fixed with the power impeller 8 and the supercharging impeller 12, i.e., the power impeller 8 and supercharging impeller 12 are fixedly formed on the same rotation shaft 15.

FIGS. 4-9 illustrate an exemplary power turbine housing 7. The power turbine housing 7 as shown is a two-piece structure and comprises a first half housing 17 and a second half housing 18. A space for mounting the power impeller 8 is formed between the first half 17 and second half 18 (see FIG. 3). In this specific example, the wind outlet 10 is formed on a side surface of the second half housing 18, the wind inlet 9 is formed on the first half housing 17 and second half housing 18 respectively, or put it another away, the wind inlet 9 is formed by combining openings on circumferential surfaces of the first half housing 17 and second half housing 18. Sealing bosses 19 are correspondingly formed on the circumferential surfaces of the first half housing 17 and second half housing 18 and provided with mounting holes 20. Bolts 21 pass through the mounting holes 20 of the first half housing 17 and second half housing 18 and may assemble the two half housings into one turbine housing when nuts are used to fasten the bolts. To form sealing between two half housings, a sealing slot 22 may be formed on at least one half housing for example the first half housing 17 (see FIG. 8), and a sealing device such as a O-ring may be provided in the sealing slot 22.

It should be appreciated that the present invention does not relate to the impeller itself. Those skilled in the art may select and use various known impellers in a conventional manner according to specific application situations, for instance, a forward impeller, a radial impeller or a rearward centrifugal impeller. It should be understood that since the power impeller and the supercharging turbine rotate synchronously, force-receiving surfaces of blades of the power impeller must face in the direction of the wind inlet in order to achieve a maximum rotation speed, and likewise force-receiving surfaces of blades of the supercharging impeller must face in the direction of the wind outlet in order to achieve the highest supercharging effect.

Figure 5:
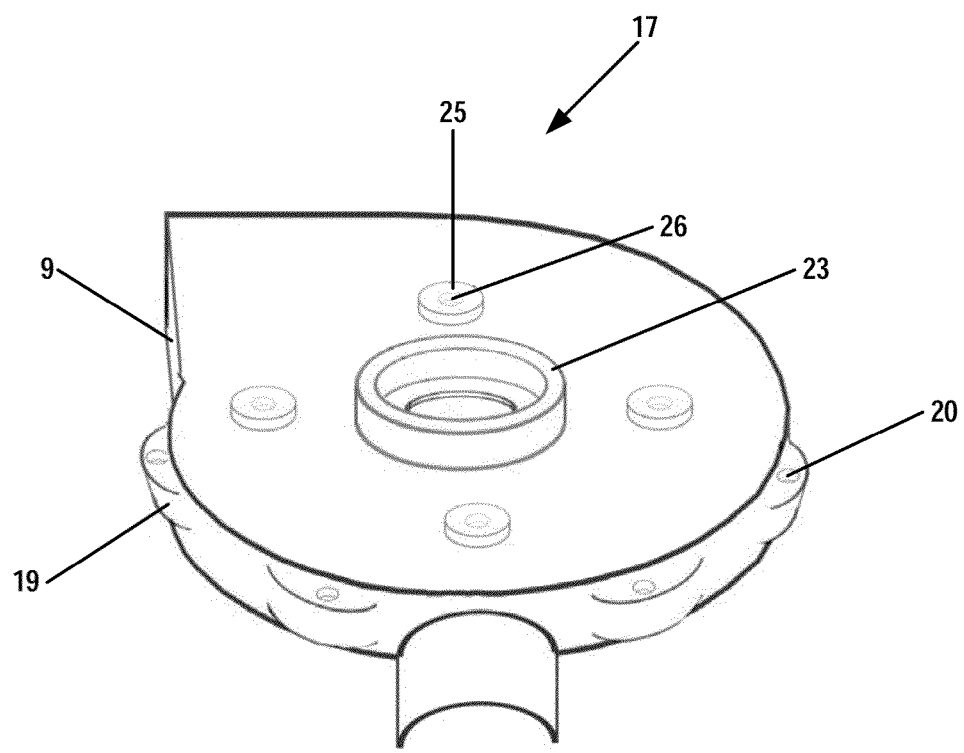
FIG. 5 is a perspective view of an exterior of a first half of the power turbine housing of FIG. 4.
Figure 6:
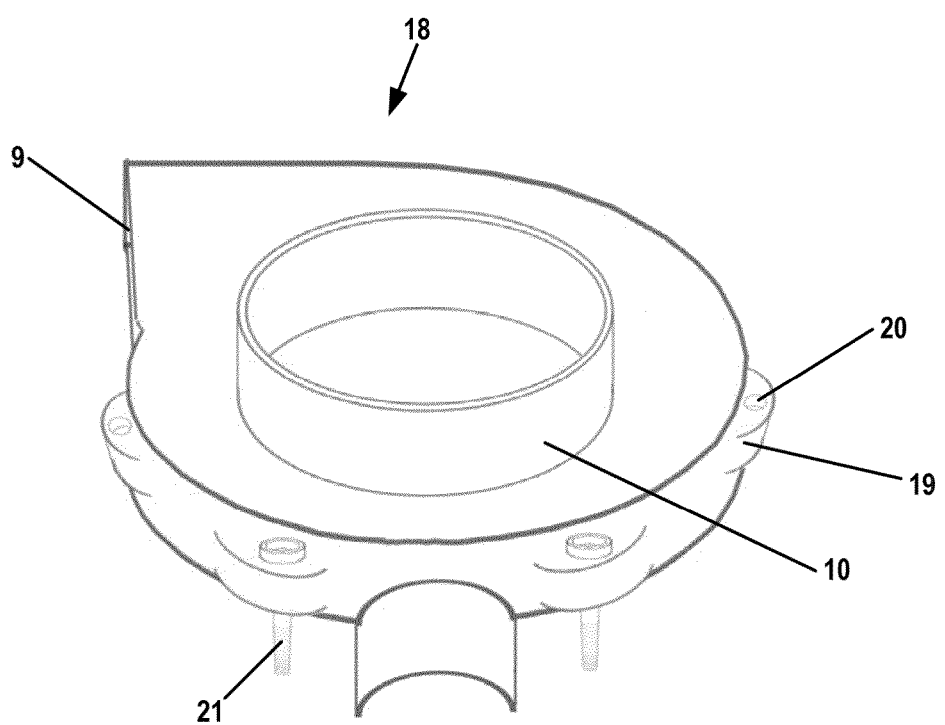
FIG. 6 is a perspective view of an exterior of a second half of the power turbine housing of FIG. 4.
Figure 7:
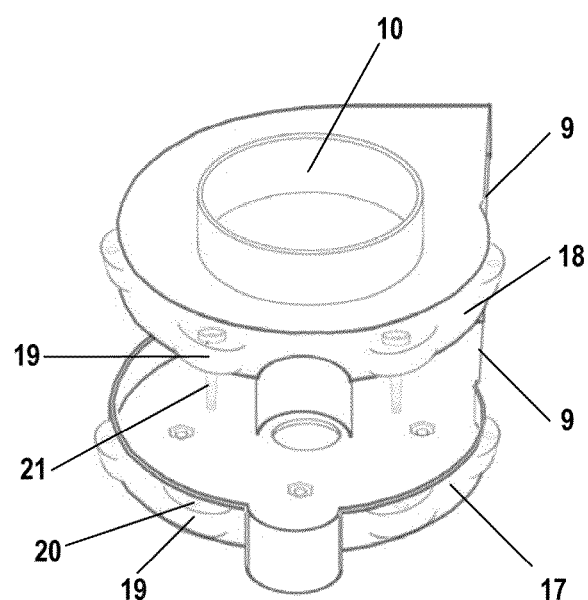
FIG. 7 is a schematic view illustrating the assembling of the two halves of the power turbine housing as shown in FIG. 5 and FIG. 6.
Figure 8:
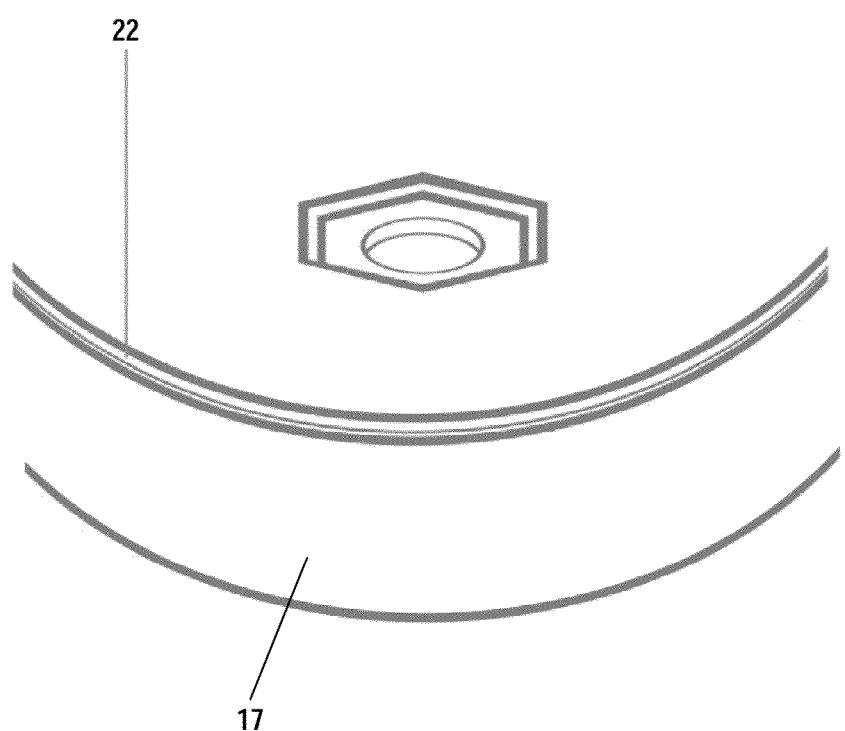
FIG. 8 illustrates a portion of the first half of the power turbine housing of FIG. 5, showing a structure for placing a seal ring.
Figure 9:
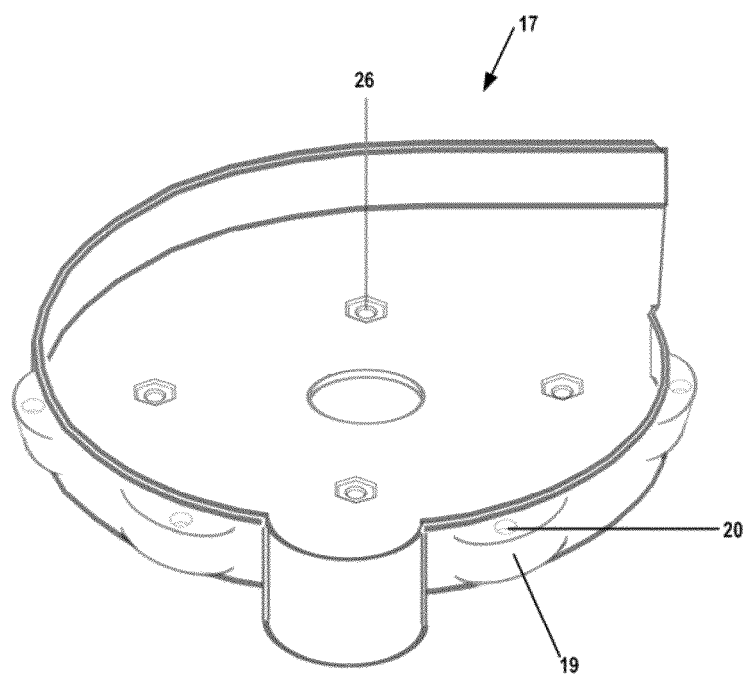
FIG. 9 is a schematic view showing interior of the first half of the power turbine housing shown in FIG. 5.

Referring to FIG. 5, on a side surface of the first half housing 17 is formed a bearing seat 23. As shown in FIGS. 1 and 3, one end of the rotation shaft 15 extending out of the straight-through flange 16 is supported in the bearing seat 23 via a bearing 24.

A plurality of threaded bosses 25 are formed around the bearing seat 23, and a threaded hole 26 is formed in each of the threaded bosses. Correspondingly, a plurality of flange plates 27 are formed at opposite ends of the straight-through flange 16, and flange holes 27 are formed on the flange plates 17, as shown in FIG. 3. Screws 32 (as shown in FIG. 3) may be used to pass through the flange holes 26 and screwed into the threaded hole 26 of the threaded boss 25, so as to fix the straight-through flange 16 together with the first half housing 17.

Although not shown in the figures, the supercharging turbine housing 11 may employ internal and external structures substantially same as those of the power turbine housing 7, i.e., the supercharging turbine housing 11 consists of two half housings, wherein the air suction inlet 13 is formed on one side of one half housing; the bearing seat 23 for supporting the rotation shaft 15 is formed on a side of the other half housing, threaded bosses are formed around the bearing seat to fix together with the flange plate 17 of the straight-through flange 16; the air outlet 14 is formed by combining openings on the circumferential surfaces of the two half housing. Bearing seats, threaded bosses and threaded holes may be identical in size and highly symmetrical for the two turbine housings.

It should be appreciated that during connection of the power turbine housing 7 with the supercharging turbine housing 11 via the straight-through flange 16, the relative positional relationship between the wind inlet 9 and air outlet 14 may completely be set according to needs, for example, the wind inlet 9 and air outlet 14 may be in the same horizontal plane, or in an angular relationship.

Figure 10:
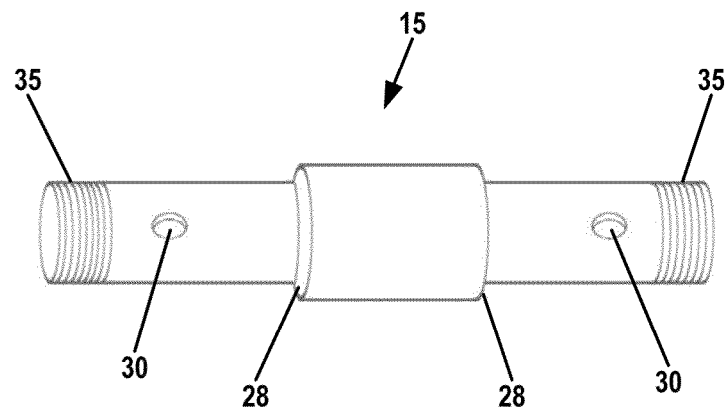
FIG. 10 is a schematic view illustrating a rotation shaft shown in FIG. 1.

As shown in FIGS. 1, 3 and 10, a fastening threaded hole 30 may be formed in a journal (namely, a portion between threads 35 and a shoulder 28) of the rotation shaft 15, and a through hole 31 is correspondingly formed in the power impeller 8 and supercharging impeller 12. A screw (not shown) is used to run through the through hole 31 in the impeller and screwed into the fastening threaded hole 30 of the rotation shaft 15 to fix the two impellers on the rotation shaft 15.

Threads 35 are formed at both ends of the rotation shaft 15, both ends of the rotation shaft 15 formed with threads 35 extend out of the power impeller 8 and supercharging impeller 12 by a sufficient length so that a fastening nut 36 is fastened on the threads 35. The power impeller 8 and supercharging impeller 12 position the bearing 24 on two shoulders 28 on the rotation shaft 15 via a bushing 29. Additionally, the fastening nut 36 may further function to fix the impeller.

Those skilled in the art can understand that the above mounting manner of the impellers and rotation shaft is only exemplary. The present invention may use various positioning manners already known in the art to fix the impellers and rotation shaft together.

The rotation shaft 15 is rotatably supported by the bearing seat 23 via the bearing 24. The length and thickness of the rotation shaft 15 may be set according to needs. Generally speaking, an impeller with a heavier load needs a thicker rotation shaft to ensure none deformation of the rotation shaft during high-speed rotation. Besides an assembling space, load-carrying factors and arrangement of support points (e.g., the present example uses two support points) need to be taken into account upon setting the length of the rotation shaft, so length of the rotation shaft should theoretically be inversely proportional to the carried weight and directly proportional to the number of support points.

Preferably, other portions of the supercharging turbine housing 11 except for the air suction inlet and air outlet 14 are gas tight to ensure no leakage of air pressure. Preferably, since external air flow entering the power turbine housing 7 usually contains dust particles, the bearing 24 for supporting the rotation shaft 15 is a high-quality sealing bearing. Preferably, the bearing 24 is a high-precision bearing to minimize the impeller rotation resistance.

According to a preferred embodiment of the present invention, since water might enter the power turbine housing 7 through the wind inlet 9 along with the external air flow in rainy or snowy weather, the power turbine 3 may further comprise a water discharge port 33, as shown in FIGS. 1, 4 and 11-13. The water discharge port 33 is formed on the power turbine housing 7 to drain the water entering the power turbine housing 7 through the wind inlet 9 out of the power turbine 3. The water discharge port 19 may employ any known water drainage structure, e.g., a direct drainage pipe directly communicating the interior and exterior of the power turbine housing 7.

Figure 11:
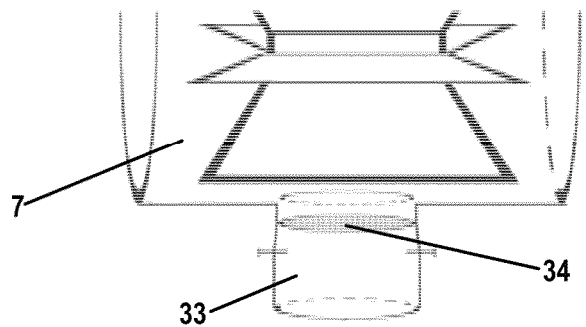
Figure 12:
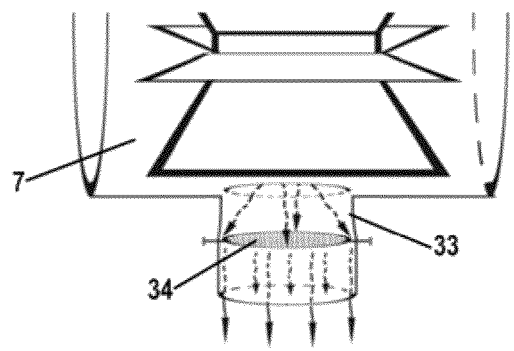
Figure 13:
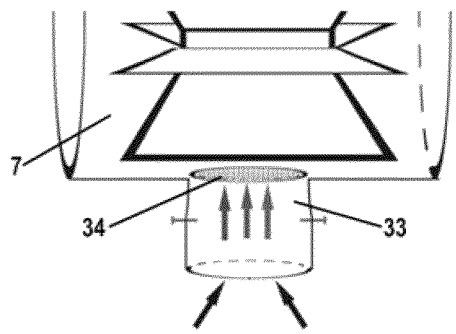
Figure 14:
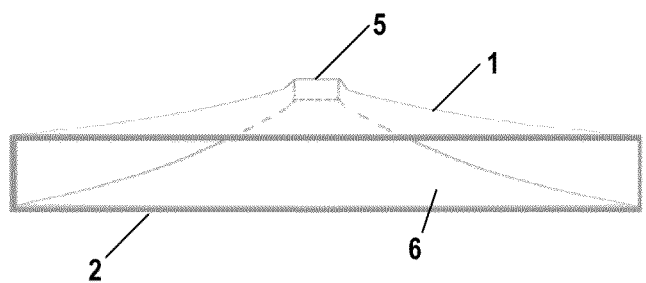
FIG. 14 is a front perspective view of a wind collecting device according to an embodiment of the present invention.
Figure 15:
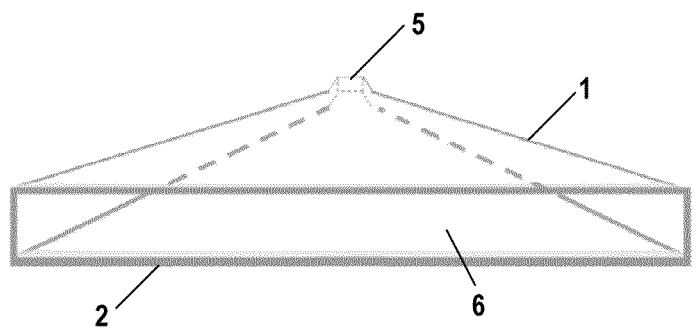
FIG. 15 is a front perspective view of a wind collecting device according to an embodiment of the present invention.

In an exemplary water discharge port structure shown in FIGS. 11-13, a valve is provided in the water drainage port 33. The valve may comprise a piston 34 which is slideable between a first position (see FIG. 13) and a second position (see FIG. 12) in the water discharge port 33. When the power impeller 8 rotates under action of the external air flow, the piston 34 moves to the first position due to an air pressure differential inside and outside the power turbine housing 7. Referring to FIG. 12, at the first position, an internal surface (namely, the surface facing towards the interior of the housing) of the piston 34 is coplanar with an internal surface of the power turbine housing 7 around the water discharge port. Such design is conducive to steady flow of the air flow in the power turbine housing 7. When the power impeller 8 stops (including the case lower than a certain rotation speed), the piston 34 returns to the second position under its own weight or under action of a spring. As shown in FIG. 12, at the second position, the interior and exterior of the power turbine housing 7 are fluidly communicated with each other to discharge the water in the housing. As an exemplary embodiment, a portion of the water discharge port 33 corresponding to the first position of the piston may have a sectional shape matching an external profile of the piston 34, whereupon the water discharge port 33 may be substantially sealed to minimize disturbance of the air flow in the power turbine housing 7; a portion of the water discharge port 33 corresponding to the second position of the piston may have a size lager than an outer diameter of the piston 34 so that a gap is formed around the piston 34 and water is discharged out of the power turbine housing 7 through the gap. Those skilled in the art should appreciate that at the second position, the water discharge port 33 may be provided with various forms of blocking structures to prevent the piston 34 from breaking away from the water discharge port 33.

Figure 16:
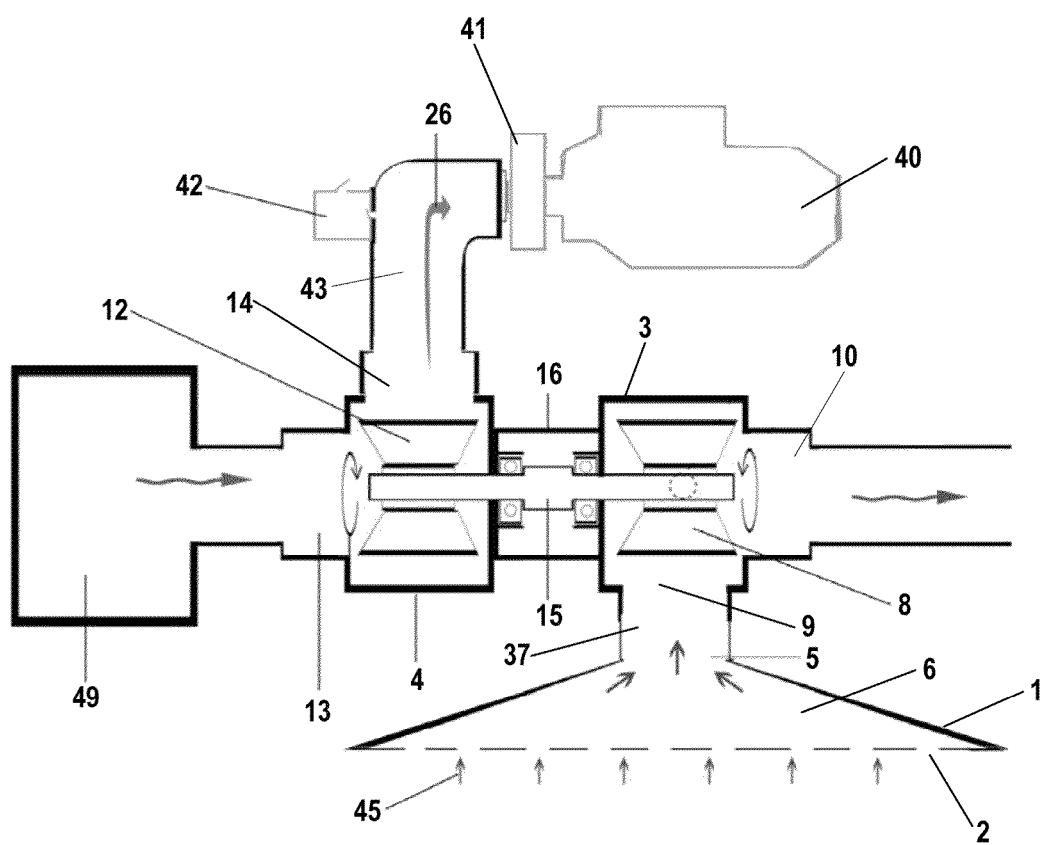
FIG. 16 is a schematic view illustrating arrangement of the turbocharging apparatus according to the present invention and the internal combustion engine in a vehicle according to an embodiment of the present invention.
Figure 17:
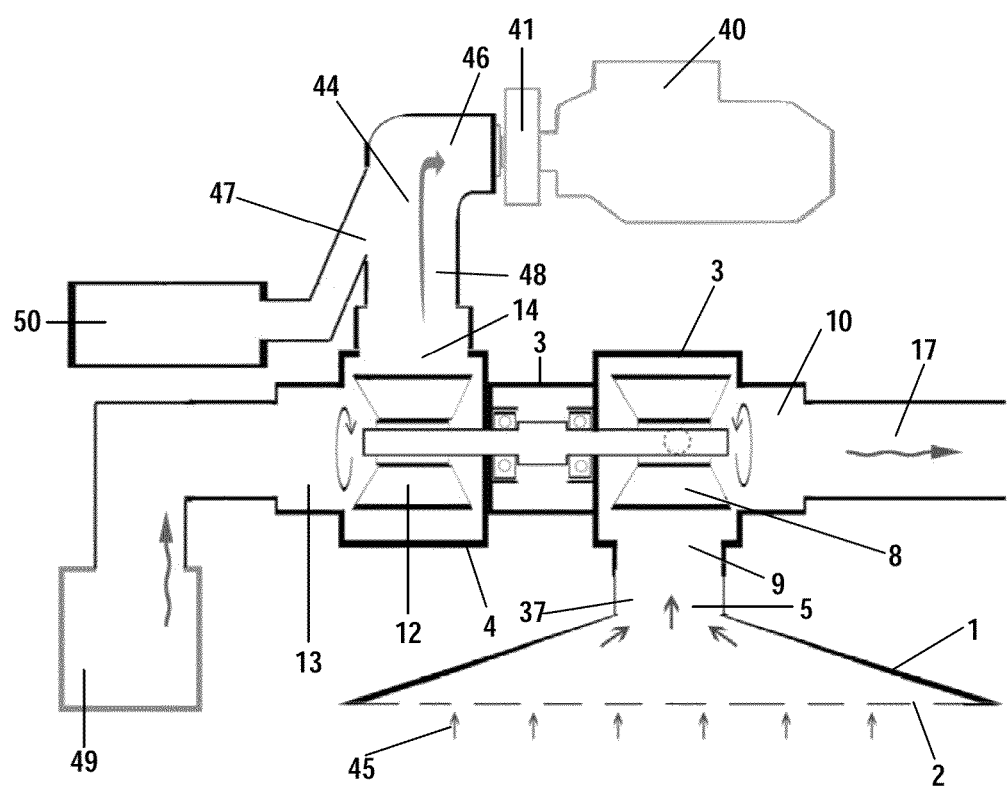
FIG. 17 is a schematic view illustrating arrangement of the turbocharging apparatus according to the present invention and the internal combustion engine in a vehicle according to another embodiment of the present invention.
Figure 18:
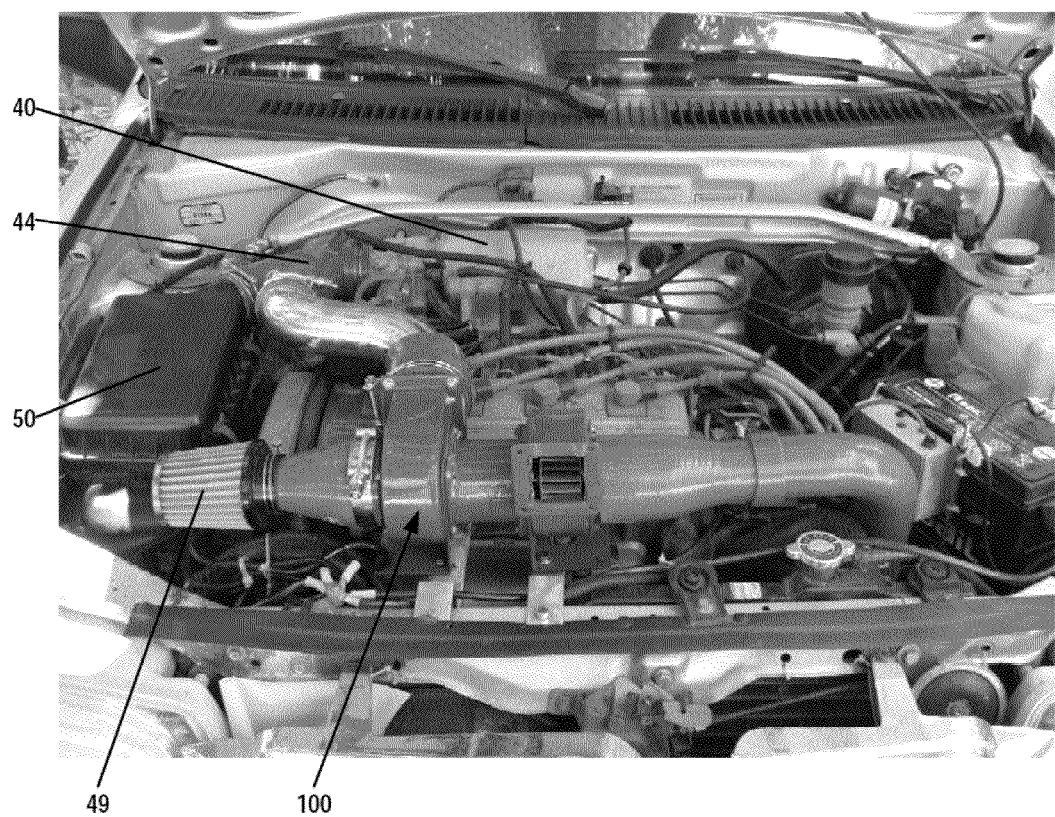
FIG. 18 is a view illustrating an engine compartment after an existing automobile is modified according to the arrangement of FIG. 17.
Figure 19:
FIG. 19 is an external view of an engine hood of the modified automobile of FIG. 18.
Figure 20:
FIG. 20 is an external view of the whole of the modified automobile of FIG. 18.

Hereunder reference is made to FIGS. 16-20 to describe a vehicle according to the present invention in detail. The vehicle according to the present invention may be various forms of vehicles, such as an automobile, using an internal combustion engine. FIG. 16 and FIG. 17 respectively illustrate two arrangements of the abovementioned turbocharging apparatus 100 and an internal combustion engine 40 in a vehicle according to an embodiment of the present invention. FIGS. 18-20 illustrate an external view of an engine compartment, an external view of an engine hood and an external view of the whole automobile after an existing automobile is modified according to the technical solution shown in FIG. 16.

The windward port 2 of the wind collecting device 1 is disposed on a windward surface of the vehicle, for example, on the engine hood of the automobile, as shown in FIGS. 18-20. When the automobile runs, an air flow 45 is generated (see FIGS. 16 and 17), the air flow 45 enters the air flow channel 6 through the windward port 2, and then forms a high-speed air flow after passing through the wind extruding port 5.

The wind extruding port 5 may be directly connected to the wind inlet 9 of the power turbine 3, or as shown in FIGS. 16 and 17, the wind extruding port 5 is connected to the wind inlet 9 through a wind collecting pipe 37. The wind collecting pipe 37 may be integrally formed with the wind collecting device 1. The wind collecting pipe may be any pipe structure capable of guiding the air flow from the wind extruding port 5 to the wind inlet 9.

The air outlet 4 of the supercharging turbine 4 of the turbocharging apparatus 100 is connected to a throttle valve 41 of the internal combustion engine 40 to deliver the air supercharged by the supercharging impeller 12 to the internal combustion engine 40. A first air filter 49 is disposed at the air suction port 13 of the supercharging turbine 4 to keep air supplied into the internal combustion engine clean.

In a specific embodiment shown in FIG. 16, the air outlet 14 of the supercharging turbine 4 is connected to the throttle valve 41 of the internal combustion engine 40 via a pipe 43. In another specific embodiment shown in FIG. 17, a pipe between the throttle valve 41 and air outlet 14 is a Y-shaped pipe 44 which trunk end 46 is connected to the throttle valve 41. The Y-shaped pipe further comprises two branch ends, namely, a first branch end 48 and a second branch end 47. The first branch end 48 is connected to the air outlet 14 of the turbocharging apparatus, and the second branch end 47 is connected to a second air filter 50. The second air filter 50 is an original filter of the modified automobile.

It should be appreciated that the air outlet 14 of the supercharging turbine 4 may be directly connected to the throttle valve 41 of the internal combustion engine 40, without a separate pipe therebetween.

Additionally, as shown in FIG. 16, a gas release valve 42 may be mounted on the pipe 43 between the air outlet 14 and throttle valve 41. As such, during travel of the automobile, when the throttle valve 41 is closed, high-pressure gas is discharged through the gas release valve 42, preventing backflow high-pressure gas from damaging the supercharging impeller. In the situation shown in FIG. 17, when the throttle valve 41 is closed, high-pressure gas may be discharged through the second air filter 50, so the mounting manner shown in FIG. 17 does not additional mounting of the gas release valve. Those skilled in the art may appreciate that the gas release valve itself is prior art and not the content of the present invention and therefore will not be detailed here.

INDUSTRIAL APPLICABILITY

Referring to FIGS. 18-20, the inventor of the present application applied the above turbocharging apparatus to Xiali TJ7131 (Toyota 8A engine, 1.3 liter) to obtain a vehicle according to the present invention and performed specific tests. As shown in FIG. 18, the original air filter 50 of Xiali TJ7131, the air outlet 14 of the supercharging turbine 4 and the throttle valve of the engine 40 may be connected together via the Y-shaped pipe 44 according to the mounting manner shown in FIG. 17. Original members of the tested vehicle such as an oil nozzle, a gasoline pump, an ECU and an exhaust pipe all were not modified.

The highest speed per hour during test this time was controlled less than 140 km, and currently mileage during this test topped 30,000 km. Before the turbocharging apparatus according to the present invention was mounted, the torque apparently reduced when the automobile run at a speed 120 km/hour on a flat road surface, and it was very difficult to maintain a 90 km per hour on a slope road. However, after the turbocharging apparatus according to the present invention was mounted, the power substantially increased and meanwhile oil consumption reduced. It only took 9 seconds for 100-meter acceleration, constant explosive force remained from low speed to high speed, the speed could be kept above 140 km when the automobile run on a long-distance slope at a high gear position (at the fifth gear position), and increase of the engine torque could be apparently felt as the automobile speed increased. The above by far exceeded the usual performance of a low-displacement car. In respect of oil consumption, air conditioning was turned on during the whole test, oil consumption per 100 km at a speed of 120 km per hour was 6 liters, and oil consumption per 100 km at a speed of 90-100 km per hour was only 4.45 liters, even lower than a nominal minimum 4.8-liter 100-km oil consumption of the original automobile. Upon operating under a high load, a surface temperature of the turbocharging apparatus was still at the level of normal temperature. The tested automobile mounted with turbocharging apparatus according to the present invention reached or exceeded a 2.5-liter natural air-suction automobile in respect of indexes such as high-speed overtaking and slope climbing.

After successful test of Japan-manufactured engines, the inventor the present invention mounted the turbocharging apparatus on Ford Mondeo produced in 2007 and performed test. The bodywork of the car weighed 1.6 tons, and acceleration was powerless before the modification; in contrast, after the modification, overall oil consumption decreased by 20 percent, and power had already exceeded any model of 3.0-liter natural air-suction car.

The turbocharging apparatus according to the present invention has the following five aspects of advantages as compared with the exhaust gas turbocharger: higher supercharging efficiency, lower production costs, simpler process, easier installation and more convenient maintenance. The exhaust gas turbocharger is costly and cannot be universally applied in the past half a century. A main reason is that due to influence of high temperature, the turbine housing, impeller and coupler in the high-temperature environment must be fabricated from a heavy, high-strength and anti-oxidation material, and be integrally connected with the engine, and a full floating bearing must be adopted to maintain the service life of the turbocharger. Even in this way, the exhaust gas turbocharger still leaks oil frequently, which directly threatens the engine. Once the engine fails, the automobile cannot run. Although a more advanced process may improve the working efficiency and service life of the exhaust gas turbocharger, higher costs will be caused. Another intrinsic drawback of the exhaust gas turbocharger is that high-temperature gas generated by heat conduction of the turbine cannot be directly sent into the engine for combustion. The reason is that the higher temperature the gas has, the gas has a smaller density, sufficient oxygen cannot be provided to the engine under whatever large pressure, and pressurized gas must flow through an intercooler for cooling before the gas can be delivered to the engine. However, high-temperature gas of the same volume gets denser after temperature reduction, but the volume gets smaller and air pressure correspondingly gets weaker. This is the main reason why the automobile mounted with the exhaust gas turbocharger exhibits low-speed weakness. The turbocharger enters effective operation conditions only after a rotation speed of the engine reaches about 2,000 revolutions and the automobile consumes more oil than automobiles with the same displacement.

As compared with the exhaust gas turbocharger, the turbocharging apparatus according to the present invention uses the air flow generated upon movement of the vehicle. The temperature of the air flow is atmospheric temperature and there is no need to overcome the problems caused by use of high-temperature gas. That is to say, at the same rotation speed, quality of air provided by the turbocharging apparatus according to the present invention to the engine is by far higher than the exhaust gas turbocharger. Since the turbocharging apparatus according to the present invention operates at a normal temperature, it has lower requirements for the material and process. Since the wind collecting port may be disposed vertically and horizontally, the turbocharging apparatus according to the present invention may be mounted more flexibly and thereby breaks away from dependence on the engine; meanwhile, even though the turbocharging apparatus according to the present invention is damaged, it does not exert any influence on normal travel of the automobile. Another further advantage is that the turbocharging apparatus according to the present invention may be made of a light and thin material, and the impeller has a better transmission performance so that it can be even made rotate when being blown with a person's mouth. Therefore, after the automobile starts to run, the turbocharging apparatus according to the present invention immediately begins to work. Tests indicated that when the automobile run at a speed of 60 km per hour, the rotation speed of the engine was about 1500 revolution, and wind pressure at the air suction port of the turbocharging apparatus of the present invention had already amounted to several times the wind pressure of a typhoon (due to the action of the wind collecting port), and the power of the automobile gets better as the travel speed of the automobile increases and turbine transmission gets quicker. In contrast, the exhaust gas turbocharger could not get into effective operation then. Therefore, the explosive force of the automobile at either a high speed or a low speed or in a start-to-run state is naturally stronger than the automobile mounted with the exhaust gas turbocharger and automobile which sucks air naturally. Additionally, after the gas pedal of the automobile mounted with the exhaust gas turbocharger is loosened, when the engine rotation speed falls below 2,000 revolutions, the power must be raised by pressing the gas pedal. In contrast, even though the engine rotation speed of the automobile mounted with the turbocharging apparatus according to the present invention falls, the automobile can still slide at a high speed, and the turbocharging apparatus is still in an optimal operation state. Once the gas pedal is slightly touched, the engine immediately exhibits strong explosive force, which not only saves oil but also achieves better power and exhibits self-evident advantages. It is certain that low costs and high efficiency of the turbocharging apparatus according to the present invention allows for universal application of the supercharging technology.

"Energy conservation and emission reduction" is advocated globally nowadays. As a speed-increasing and emission-reducing technology, the exhaust gas turbocharger is always a main turbocharger in the long past, but it is unaffordable for many consumers due to complicated process and high manufacture costs. Undoubtedly the conventional exhaust gas turbocharging technology is increasingly getting into a "bottleneck". This is particularly prominent in the present day when high efficiency and applicability is emphasized. It is inevitable to seek for a better substitute. Before the present invention is made, neither the mechanical turbocharging, nor pressure wave turbocharging, nor electronic turbocharging, nor other various so-called "turbocharging" technologies using natural air-intake principle to change air flow movement can be comparable with the exhaust gas turbocharging technology and cannot be accepted by the consumers. The turbocharging apparatus according to the present invention is a subversive innovative solution in aspects such as manufacturing technology, production costs and working efficiency as compared with the conventional turbochargers and can completely replace and surpass the conventional exhaust gas turbocharger. The most advanced TS supercharging technology available in the current market solves the problem of low-speed weakness of the engine, but is at the cost of high costs, and is by far incomparable with the turbocharging apparatus according to the present invention in terms of oil-saving effect and economy efficiency.

As calculated based on the manufacturing materials of the turbocharging apparatus of the present invention, the cost is only between RMB200-500 yuan, equivalent to or less than one tenth of the manufacturing cost of the exhaust gas turbocharger, and enhancement caused by the turbocharging apparatus according to the present invention to the performance of the automobile also exceeds the exhaust gas turbocharger. As the manufacturing process gets sound, the turbocharging apparatus according to the present invention will bring about more positive and pleasant changes in aspects such as enhancement of engine power and energy conservation and emission reduction. Advantages such as flexible selection of materials, diverse assembling schemes, simple and convenient manufacture and maintenance, higher and stronger working efficiency and the like indicate the turbocharging apparatus according to the present invention will have an extremely broad application prospect in automobile industry and vehicles using the internal combustion engine as the leading power.

What is claimed is:

1. A turbocharging apparatus, comprising:
    a wind collecting device which is barrel-shaped and comprises a first opening and a second opening located at opposite ends of the wind collecting device respectively, and an air flow channel configured to connect the first opening and the second opening and guide an air flow to flow therethrough, the air flow channel having a cross-sectional area decreasing as the air flow channel extending from the first opening towards the second opening,
    a first turbine comprising:
        a first turbine housing,
        a first impeller rotatably located in the first turbine housing,
        a wind inlet formed on the first turbine housing and connected to the second opening of the wind collecting device to guide the air flow from the wind collecting device to enter the first turbine housing and drive the first impeller to rotate, and
        a wind outlet formed on the first turbine housing to guide the air flow having entered the first turbine housing through the wind inlet and rotating the first impeller to drive the air flow out of the first turbine housing; and
    a second turbine comprising:
        a second turbine housing,
        a second impeller rotatably located in the second turbine housing, the second impeller being configured to be driven by the first impeller, and rotate with the first impeller,
        an air suction inlet formed on the second turbine housing such that external air is sucked through the air suction inlet into the second turbine housing due to the rotation of the second impeller and supercharged by the second impeller, and
        an air outlet configured to guide the air supercharged by the second impeller to flow out of the second turbine housing.

2. The turbocharging apparatus according to claim 1, wherein other portions of the second turbine housing except for the air suction inlet and the air outlet are gas tight.

3. The turbocharging apparatus according to claim 1, wherein the first impeller and the second impeller are fixedly formed on the same rotation shaft.

4. The turbocharging apparatus according to claim 1, wherein the first turbine further comprises a water discharge port which is formed on the first turbine housing to drain water entering the first turbine housing through the wind inlet out of the first turbine housing.

5. A vehicle having a turbocharged internal combustion engine comprising a turbocharging apparatus according to claim 1, wherein,
    the first opening of the wind collecting device is disposed on a windward surface of the vehicle,
    the air outlet of the second turbine is connected to a throttle valve of the internal combustion engine to deliver the air supercharged by the second impeller to the internal combustion engine.

6. The turbocharging apparatus according to claim 3, further comprising bearing seats and bearings disposed in the bearing seats, and the rotation shaft is rotatably supported on the bearing seats by the bearings.

7. The turbocharging apparatus according to claim 6, wherein the bearing seats are formed on the first turbine housing and the second turbine housing.

8. The turbocharging apparatus according to claim 4, wherein in the water discharge port is provided a valve.

9. The turbocharging apparatus according to claim 8, wherein the valve comprises a piston which is slideable in the water discharge port between a first position where an internal surface of the piston is coplanar with an internal surface of the first turbine housing around the water discharge port and a second position where interior and exterior of the first turbine housing are fluidly communicated with each other, and wherein when the first impeller rotates, the piston is configured to move to the first position due to an air pressure differential between inside and outside the first turbine housing; and when the first impeller stops rotation, the piston is configured to return to the second position.

10. The vehicle according to claim 5, wherein a first air filter is disposed at the air suction port of the second turbine.

11. The vehicle according to claim 10, wherein the air outlet of the turbocharging apparatus is directly connected to a throttle valve of the internal combustion engine.

12. The vehicle according to claim 10, wherein the air suction port of the internal combustion engine is provided with a Y-shaped pipe which comprises a trunk end and two branch ends, wherein the trunk end is connected to the throttle valve of the internal combustion engine, one of the branch ends of the Y-shaped pipe is connected to the air outlet of the second turbine, and the other one of the branch ends is connected to a second air filter.

13. The vehicle according to claim 11, further comprising a gas release valve mounted on a pipe between the air outlet of the second turbine and the throttle valve of the internal combustion engine to discharge high-pressure gas.

* * * * *